United States Patent
Oberg et al.

(10) Patent No.: US 9,165,599 B1
(45) Date of Patent: *Oct. 20, 2015

(54) METHOD FOR CORRECTING DC CHARACTERISTICS IN A MAGNETIC RECORDING SYSTEM

(71) Applicant: Marvell International Ltd., Hamilton (BM)

(72) Inventors: Mats Oberg, Cupertino, CA (US); Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,641

(22) Filed: Jul. 1, 2014

Related U.S. Application Data (60) Continuation of application No. 13/745,694, filed on Jan. 18, 2013, now Pat. No. 8,773,786, which is a division of application No. 13/350,684, filed on Jan. 13, 2012, now Pat. No. 8,358,479, which is a continuation of application No. 12/022,131, filed on Jan. 29, 2008, now Pat. No. 8,098,447, which is a division of application No. 10/752,817, filed on Jan. 6, 2004, now Pat. No. 7,330,320.

(60) Provisional application No. 60/478,869, filed on Jun. 16, 2003, provisional application No. 60/485,216, filed on Jul. 7, 2003.

(51) Int. Cl.
*G11B 5/02* (2006.01)
*G11B 20/10* (2006.01)
*H04L 25/03* (2006.01)
*H04L 25/06* (2006.01)
*G11B 20/14* (2006.01)

(52) U.S. Cl.
CPC .... *G11B 20/10351* (2013.01); *G11B 20/10203* (2013.01); *G11B 20/10009* (2013.01); *G11B 2020/1457* (2013.01); *H04L 25/03866* (2013.01); *H04L 25/06* (2013.01)

(58) Field of Classification Search
None
See application file for complete search history.

(56) References Cited

U.S. PATENT DOCUMENTS 3,649,915 A 3/1972 Mildonian
5,122,912 A 6/1992 Kanota
(Continued)

OTHER PUBLICATIONS

Fair, et al., "Guided Scrambling: A New Line Coding Technique for High Bit Rate Fiber Optic Transmission Systems," IEEE Transaction on Communications, vol. 39, No. 2, Feb. 1991.
(Continued)

*Primary Examiner* — Dismery Mercedes (57) ABSTRACT

A method includes: writing data in a magnetic recording system using a write channel of the magnetic recording system; processing output data of the write channel in accordance with a read channel of the magnetic recording system to measure baseline wander; and triggering re-writing through the write channel using different data scramblings when the measured baseline wander fails to satisfy a criterion. The processing can include modeling the read channel of the magnetic recording system, modeling one or more high pass filtering circuits of the magnetic recording system, or both. The writing can include encoding the data after scrambling of the data, the processing can include using a discrete time model of DC offset in the magnetic recording system, and the triggering can include triggering re-writing through the write channel using different scrambling seeds when the measured baseline wander fails to exceed a threshold.

19 Claims, 6 Drawing Sheets

(56) References Cited

U.S. PATENT DOCUMENTS

| | | | |
|---|---|---|---|
| 5,459,679 A | 10/1995 | Ziperovich | |
| 5,706,346 A * | 1/1998 | Katta et al. | 380/217 |
| 5,757,294 A | 5/1998 | Fisher | |
| 5,790,495 A | 8/1998 | Kimura | |
| 5,815,514 A * | 9/1998 | Gray | 714/775 |
| 5,898,394 A * | 4/1999 | Kobayashi et al. | 341/58 |
| 5,931,968 A * | 8/1999 | Gray | 714/806 |
| 5,978,162 A | 11/1999 | Behrens | |
| 6,104,557 A * | 8/2000 | Kasai et al. | 360/46 |
| 6,140,857 A | 10/2000 | Bazes | |
| 6,148,025 A | 11/2000 | Shirani | |
| 6,173,019 B1 | 1/2001 | Hee | |
| 6,177,890 B1 | 1/2001 | Keirn | |
| 6,208,477 B1 | 3/2001 | Cloke | |
| 6,211,716 B1 | 4/2001 | Nguyen | |
| 6,219,192 B1 | 4/2001 | Gopalaswamy | |
| 6,266,202 B1 | 7/2001 | Nguyen | |
| 6,370,205 B1 | 4/2002 | Lindoff | |
| 6,415,003 B1 | 7/2002 | Raghavan | |
| 6,512,644 B1 | 1/2003 | Hall | |
| 6,557,136 B1 | 4/2003 | Friedmann | |
| 6,578,164 B1 | 6/2003 | Stokes | |
| 6,661,356 B1 | 12/2003 | Oberg | |
| 6,731,228 B2 * | 5/2004 | Lee et al. | 341/58 |
| 6,738,935 B1 * | 5/2004 | Kimmitt | 714/701 |
| 6,762,895 B2 | 7/2004 | Osafune | |
| 6,792,566 B2 | 9/2004 | Chen | |
| 6,862,701 B2 | 3/2005 | Walker | |
| 6,917,314 B1 | 7/2005 | Oberg | |
| 7,006,016 B1 * | 2/2006 | Feng | 341/58 |
| 7,103,123 B2 | 9/2006 | Chang | |
| 7,116,504 B1 | 10/2006 | Oberg | |
| 7,158,058 B1 * | 1/2007 | Yu | 341/58 |
| 7,228,480 B1 | 6/2007 | McEwen et al. | |
| 7,330,320 B1 | 2/2008 | Oberg | |
| 7,525,746 B1 | 4/2009 | Oberg | |
| 7,583,456 B1 | 9/2009 | Oberg | |
| 7,660,224 B2 * | 2/2010 | Coene et al. | 369/59.17 |
| 7,808,404 B1 * | 10/2010 | Yu | 341/58 |
| 8,018,357 B1 | 9/2011 | Tsai | |
| 8,472,563 B2 * | 6/2013 | Esumi et al. | 375/317 |
| 2002/0003675 A1 * | 1/2002 | Tomiyama et al. | 360/53 |
| 2003/0206604 A1 | 11/2003 | Lai | |
| 2004/0130816 A1 | 7/2004 | Feyh | |
| 2006/0083328 A1 | 4/2006 | Green | |

OTHER PUBLICATIONS

Proakis, J.G., "Generation of PN Sequences," Digital Communications, 2nd ed., McGraw Hill International, pp. 831-836, 1989.

* cited by examiner

MODEL WITH HIGH PASS FILTER

FIG. 6B

EQUIVALENT MODEL WITH LOW PASS FILTER

METHOD FOR CORRECTING DC CHARACTERISTICS IN A MAGNETIC RECORDING SYSTEM

CROSS-REFERENCE TO RELATED APPLICATIONS

This application is a continuation application of, and claims priority to, U.S. patent application Ser. No. 13/745,694, filed on Jan. 18, 2013, entitled "System for Correcting DC Characteristics of a Magnetic Recording System", now U.S. Pat. No. 8,773,786, which is a divisional application of, and claims priority to, U.S. patent application Ser. No. 13/350,684, filed on Jan. 13, 2012, entitled "Method and Apparatus to Limit DC-Level in Coded Data", now U.S. Pat. No. 8,358,479, which is a continuation application of, and claims priority to, U.S. patent application Ser. No. 12/022,131, filed on Jan. 29, 2008, entitled "Method and Apparatus to Limit DC-Level in Coded Data", now U.S. Pat. No. 8,098,447, which is a divisional application of U.S. patent application Ser. No. 10/752,817, filed on Jan. 6, 2004, entitled "Method and Apparatus to Limit DC-Level in Coded Data", now U.S. Pat. No. 7,330,320, which claims priority from U.S. Provisional Patent Application No. 60/478,869, filed on Jun. 16, 2003, entitled "Method and Apparatus to Limit DC-Level in Coded Data", and U.S. Provisional Application No. 60/485,216, filed on Jul. 7, 2003, entitled "Scrambling to Reduce DC-Content in Encoded Data". The application herein claims the benefit of priority of all of the above listed patent applications and hereby incorporates by reference in their entirety the said patent applications.

BACKGROUND

Perpendicular magnetic recording (PMR) techniques may enable higher recording densities on magnetic storage media than conventional longitudinal magnetic recording techniques. PMR systems include heads that record bits perpendicular to the plane of the disk. PMR disks include a high permeability ("soft") magnetic underlayer between a perpendicularly magnetized thin film data storage layer and the substrate. An image of the magnetic head pole created by the head is produced in the magnetically soft underlayer. Consequently, the storage layer is effectively in the gap of the recording head, where the magnetic recording field is larger than the fringing field produced by a longitudinal magnetic recording (LMR) head. The larger recording field makes it possible to record using smaller grain sizes and smaller bit sizes than in LMR systems.

In PMR, the channel response has a DC component. For a channel that is AC-coupled to the preamplifier and read channel, or that contains some other means for high-pass filtering the channel response, there may be DC-distortion. The DC-distortion may manifest itself as a data dependent baseline wander, which can severely affect the performance of a system that equalizes the channel response to a response target that is not DC-free.

SUMMARY

In an embodiment, a perpendicular magnetic recording (PMR) system may scramble an input data sequence with a first scramble seed and encode the scrambled data sequence with a modulation encoder (e.g., a run length limited (RLL) encoder). The system may then determine whether the scrambled and encoded data sequence includes one or more patterns associated with large baseline wander, using, e.g., the running digital sum (RDS) over the sequence or a low pass filter as a metric. If such a pattern is detected, the system may control the scrambler to re-scramble the data sequence with another scrambler seed, encode the re-scrambled sequence, and determine whether this scrambled and encoded sequence includes on or more patterns associated with large baseline wander. This process may be repeated until a scrambled and encoded sequence without such patterns is generated, or until all available scrambler seeds are exhausted, in which case, the scrambler seed with the least amount of baseline wander may be used. The best scrambled and decoded sequence may then be written to the magnetic recording medium.

In an alternative embodiment, a PMR system may scramble an input data sequence with a first scramble seed and encode the scrambled data sequence with a modulation encoder (e.g., a run length limited (RLL) encoder). A write signal may be generated and the encoded data sequence written to the magnetic recording medium. The write signal may also be fed back to a read channel in the system. The write signal may be passed through a filter to mimic the magnetic recording channel. The read channel may then determine if DC-wander in the write signal is too large to be accurately decoded. If so, the data sequence may be scrambled with another scramble seed, encoded, and used to over-write the first encoded data sequence in the magnetic recording medium. This process may be repeated until an encoded data sequence that can be accurately decoded by the read channel is generated.

For both of the alternative embodiments described above, the data sequence may not be scrambled in the first run through the system.

DETAILED DESCRIPTION

Figure 1:
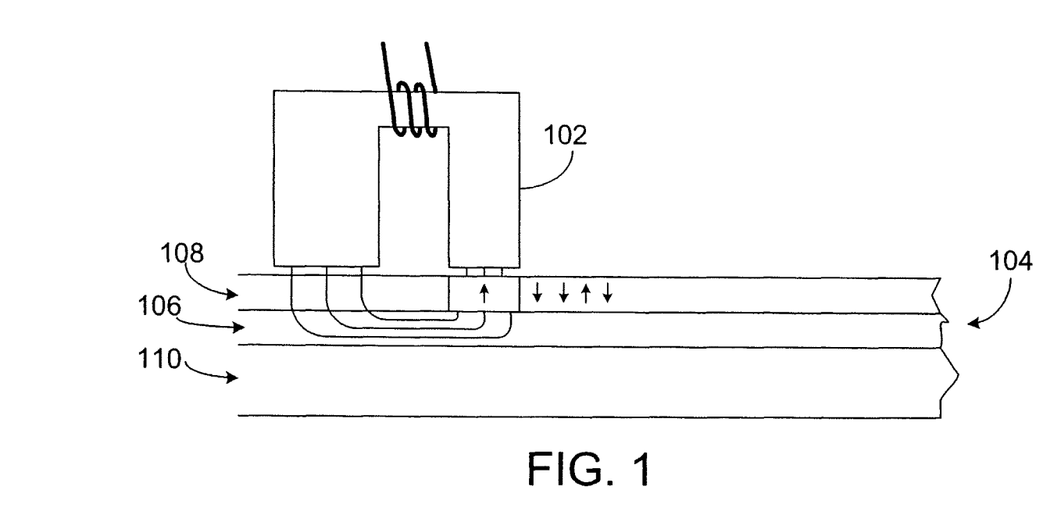
FIG. 1 is a block diagram of a read/write head and media in a perpendicular magnetic recording (PMR) system.

FIG. 1 shows a read/write head 102 and magnetic storage disk 104 in a perpendicular magnetic recording (PMR) system. The head records bits perpendicular to the plane of the disk. PMR disks include a high permeability ("soft") magnetic underlayer 106 between a perpendicularly magnetized thin film data storage layer 108 and the substrate 110. An image of the magnetic head pole created by the head 102 is produced in the magnetically soft underlayer 106. Consequently, the storage layer 108 is effectively in the gap of the recording head, where the magnetic recording field is larger than the fringing field produced by a longitudinal magnetic recording (LMR) head.

In PMR, the channel response has a DC component. For a channel that is AC-coupled to the preamplifier and read channel, or that contains some other means for high-pass filtering the channel response, there may be DC-distortion. The DC-distortion may manifest itself as a data dependent baseline wander, which can severely affect the performance of a system that equalizes the channel response to a response target that is not DC-free.

Figure 2:
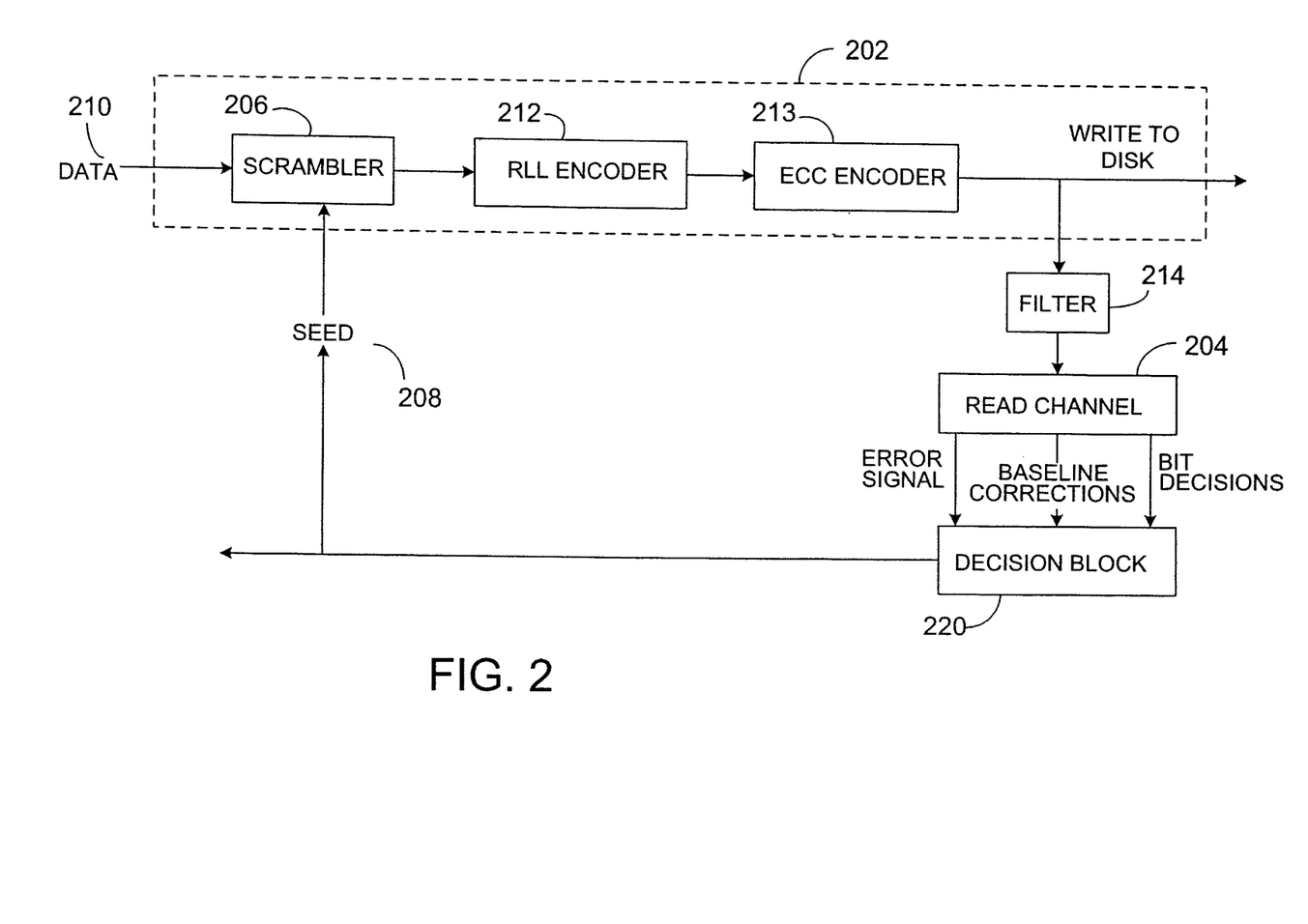
FIG. 2 is a block diagram of a write channel and a read channel in the PMR system.

FIG. 2 shows a write channel 202 and a read channel 204 for the PMR system. In an embodiment, the data that is being written by the write channel 202 is fed back into the read channel 204. The read channel processes the data and decides if the written sequence is likely to have very poor DC characteristics. If that is the case, the write channel changes a scrambler seed and rewrites the data using the new scrambler seed.

Figure 3:
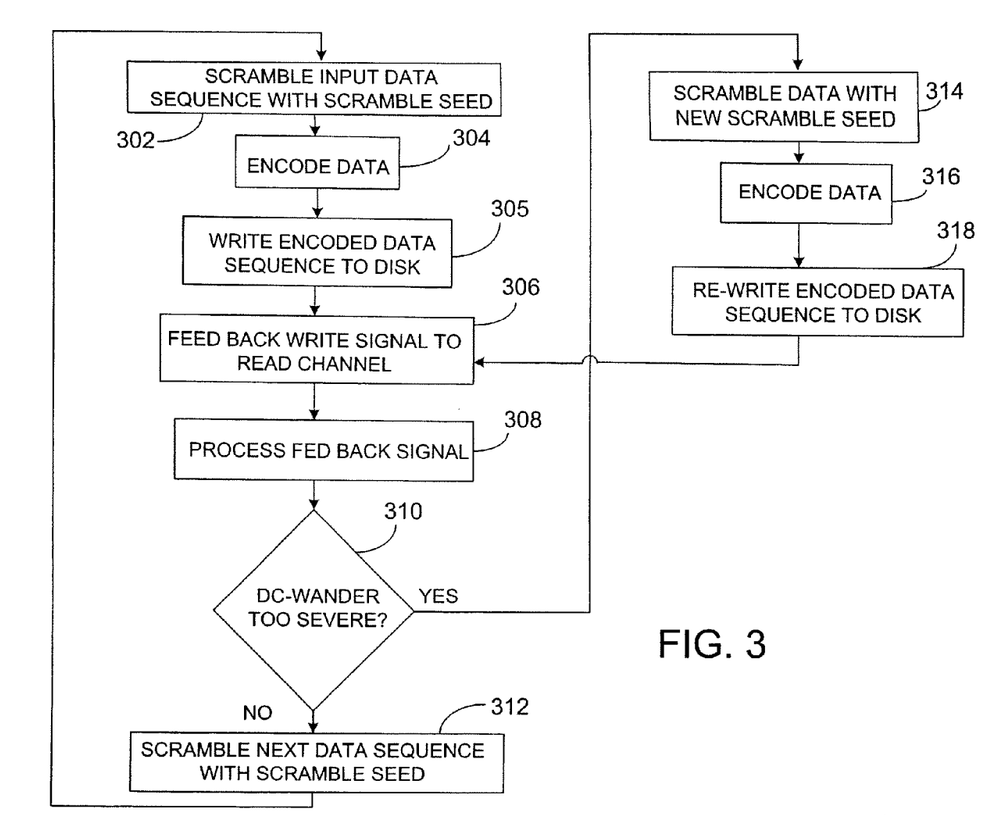
FIG. 3 is a flowchart describing a DC-wander correction technique according to an embodiment.

FIG. 3 is a flowchart describing a DC-wander correction technique according to an embodiment. A scrambler module 206 may use a scrambler seed 208 to scramble the data 210 input to the write channel 202 (block 302). The data may be scrambled before it is encoded by the modulation encoder, e.g., a run length limited (RLL) encoder 212 (block 304). Alternatively, the scrambling may be performed after modulation encoding if the scrambler used does not destroy the constraints imposed by the modulation encoder (for example, if only bits that are left uncoded by the modulation encoder are scrambled and those bits do not affect how the encoded bits were encoded).

A number of different scramblers may be used. For example, in an embodiment, a pseudo-noise (PN) sequence generated using a maximum-length shift register may be added modulo-2 to each data bit to be scrambled. Regardless of the type of scrambler used, the detector must know if and how the data was scrambled to properly descramble the data. In an embodiment, the detector may know how the data is scrambled, but may not necessarily know the initial conditions or the scrambler seed that was used to scramble the data. This information (e.g., the scrambler seed or method) may be embedded in the data that is written. Alternatively, the detector may descramble the data by trial and error. For example, the detector may descramble the data following a predetermined list of scramblers/scrambler seeds until the descrambled data decodes properly by some error-control code (ECC) 213, cyclic redundancy check (CRC) code, or some other check. In an embodiment, the scrambling is done prior to ECC encoding in the write channel, and descrambling is done after ECC decoding at the detector.

The write signal generated by the write channel is written to the disk (block 305). The write signal is also fed back into the read channel 204 (block 306), possibly via a filter 214 to mimic the magnetic channel. The read channel 204 processes the signal (block 308), and a decision block 220 determines if the DC-wander is too severe to be handled in the read channel (block 310). If the DC-wander is determined to be within acceptable limits at block 310, then the next data sequence in the input data stream is scrambled (block 312) and encoded. However, if the DC-wander is determined to be too severe, the read channel requests that the sector be rewritten with another scrambler seed (block 314). The newly scrambled data sequence is then encoded (block 316) and rewritten to the disk (block 318), over-writing the "bad" sequence.

In an embodiment, all of the functions in the read channel 204 that would be expected to be active in the actual reading of a waveform from the disk are active. An error signal generated internally in the read channel may be used to monitor how severe the DC-wander is at the detector input (at block 310). If the DC-wander is determined to be too large, a re-write request may be asserted by the read channel. In other embodiments, various functions of the read channel may disabled. For example, in an embodiment, the bit detector may be disabled, since the bits can be obtained directly from the write channel.

Several parameters may be used by the decision block 220 to determine whether the DC-wander is too large. The following are exemplary parameters for determining excessive DC-wander:

(a) Simple threshold: the decision block 220 considers the DC-wander to be too large if the absolute value of the error signal is larger than a given threshold at any point in the data sequence;

(b) The decision block 220 considers the DC-wander to be too large if the absolute value of the error signal is larger than a given threshold for a total of at least a given number of clock cycles;

(c) The decision block 220 considers the DC-wander to be too large if the absolute value of the error signal exceeds the given threshold for at least a given number of consecutive clock cycles. For example, in an embodiment, the threshold is 3 and the given number of consecutive cycles is three. The error sequence $|e|=\{0, 1, 4, 5, 1, 6, 3, 4, 6, 7, 2, 3, 7\}$ has seven numbers greater than 3. However, only the three consecutive occurrences of numbers greater than 3 (i.e., the sub-sequence $\{4, 6, 7\}$) are counted.

The parameters described above may be used separately or combined. For example, the "simple threshold" (a) and "consecutive clock cycle" (c) parameters can be combined. Then the threshold for (a) should be larger than the threshold for (c).

In an embodiment, an encoded data sequence may be inspected for patterns that might cause large baseline wander before being written to disk, i.e., in the write channel. The data sequence may be repeatedly scrambled and encoded until an acceptable level of estimated DC-wander has been achieved. The data sequence may then be written to disk.

Figure 4:
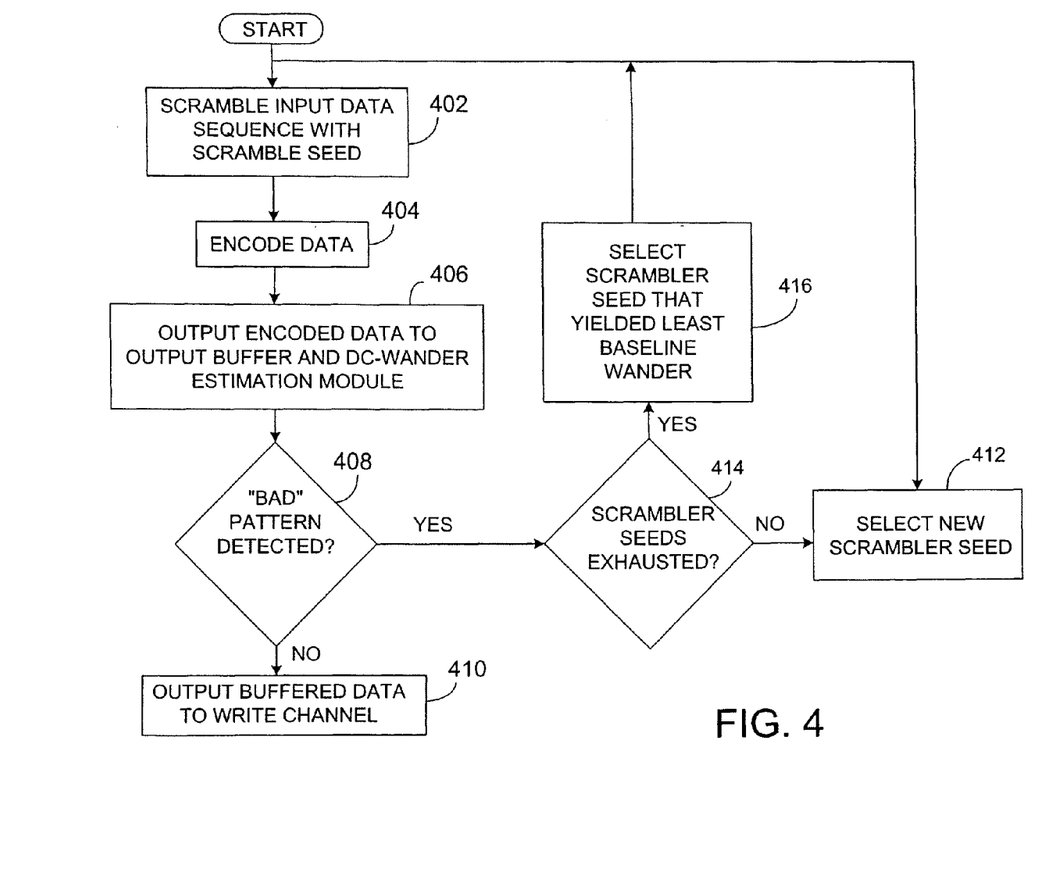
FIG. 4 is a flowchart describing a DC-wander correction technique according to another embodiment.
Figure 5:
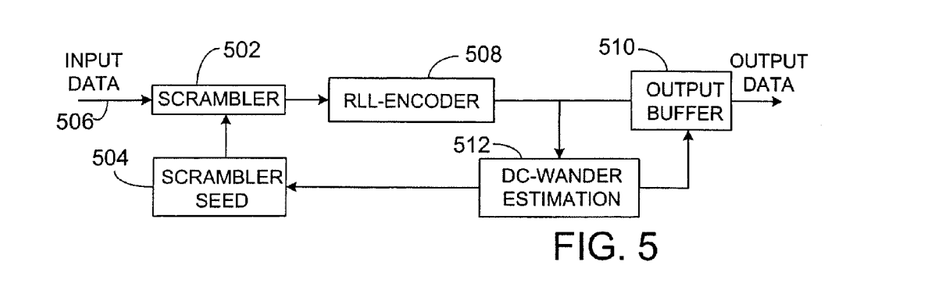
FIG. 5 is a block diagram of an encoding portion of a write channel in a PMR system.

FIG. 4 is a flowchart describing a DC-wander correction technique according to an embodiment. As shown in FIG. 5, a scrambler module 502 may use a scrambler seed 504 to scramble data sequences in an input data stream 506 (block 402). Information about the scrambler (e.g., the scrambler seed or method) may be embedded in the data so that the data can be readily decoded by the detector. The scrambled data may then be encoded by an RLL encoder 508 (block 404).

After the RLL encoder, the encoded data may be output to an output buffer 510 and a DC-wander estimation module 512 (block 406). The DC-wander estimation module may screen for patterns that might cause large baseline wander (i.e., "bad" patterns) (block 408). If no such pattern is found, the output buffer may output the encoded data to the write channel for further processing and writing to the disk (block 410). Otherwise, the data is scrambled using another scrambler seed (block 412) and then encoded by the RLL encoder 508 (block 404). The newly encoded data sequence is then screened for patterns that may cause large baseline wander (block 408). This process may continue until the encoded data sequence is determined to contain no bad patterns. The encoded data is then output to the write channel. In the case that all scrambler seeds are exhausted (block 414), the data may be scrambled using the scrambler seed that yielded the least baseline wander (block 416).

Several metrics may be used by the DC-wander estimation module 512 to measure baseline wander. In an embodiment, the maximum absolute value of the running digital sum ($RDS^{max}$) over the entire sequence may be used.

The running digital sum of a binary sequence $x=\{x_0, x_1, \ldots\}$, where $x_i=\pm 1$ is defined as $$RDS(n) = \sum_{i=0}^{n} x_i \qquad (1)$$

The maximum absolute value of RDS over a sequence of length N is $$RDS^{max} = \max_{0 \le n \le N-1} |RDS(n)|. \qquad (2)$$

A first method to determine if a sequence has large baseline wander uses equation (2) for the entire sequence. If $RDS^{max}$ is above a certain threshold, the sequence is considered to have a large baseline wander. In the case that all available sequences have a large baseline wander, the sequence with the smallest $RDS^{max}$ may be selected.

A second method splits the sequence into two or more subsequences, and uses the first method for each sub-sequence. In the case that all available sequences have one or more sub-sequences with large baseline wander, the sequence with the smallest number of sub-sequences with large baseline wander may be selected. A tie among those can, for example, be broken by selecting the sequence with the smallest $RDS^{max}$.

For a third method, the number of bit periods for which the absolute value of the RDS is greater than a threshold is counted.

$$RDS^{count} = \sum_{i=0}^{N-1} I_i, \qquad (3)$$

where $I_i$ is an indicator function $$I_i = \begin{cases} 1 \text{ if } |RDS(i)| > t_h \\ 0 \text{ if } |RDS(i)| \le t_h \end{cases} \qquad (4)$$

If $RDs^{count}$ is greater than a certain value, the sequence is determined to have a large baseline wander. If all available sequences have large baseline wander, then the sequence with the smallest $RDS^{count}$ is selected.

A fourth method is similar to the third method, but only the first instance when several consecutive values of the RDS is greater than a threshold is counted.

$$RDS^{nbr} = \sum_{i=0}^{N-1} I_i^b, \qquad (5)$$

where $$I_i^b = \begin{cases} 1 \text{ if } |RDS(i)| > t_h \text{ and } |RDS(i)| \le t_h \\ 0 \text{ otherwise} \end{cases} \qquad (6)$$

For example, if the RDS for a sequence of length 20 is given by $\{1, 0, -1, -2, -3, -4, -5, -4, -3, -4, -3, -2, -1, 1, 2, 1, 2, 3, 2\}$, and the threshold $t_h=3$. Then $RDS^{count}=4$ using equation (3), and $RDS^{nbr}=2$ using equation (5).

In a fifth method, the mean of the absolute value of the RDS is used.

$$RDS^{mean} = \frac{1}{N} \sum_{i=0}^{N-1} |RDS(i)|. \qquad (7)$$

If $RDS^{mean}$ is greater than a threshold, the baseline wander may be considered to be large.

Figure 6A:
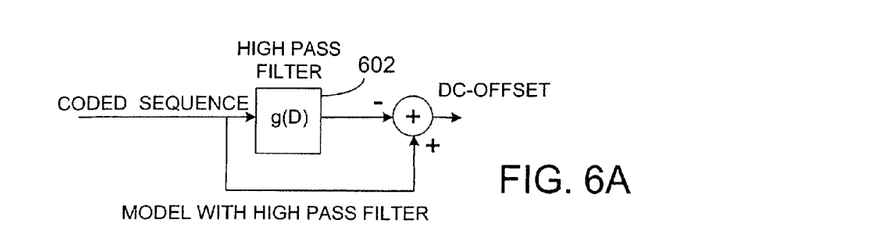
FIG. 6A is a block diagram of a system modeling DC-offset due to high pass filters.
Figure 6B:
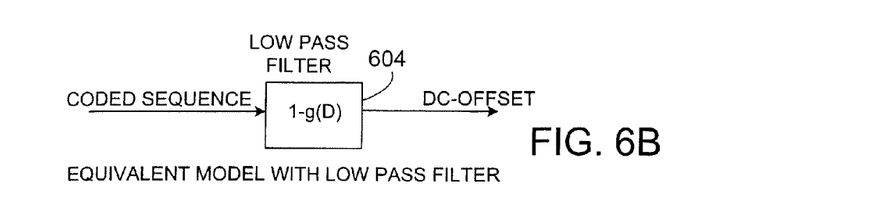
FIG. 6B is a block diagram of an equivalent system modeling DC-offset due to high pass filters using a low pass filter.

In an alternative embodiment, a low pass filtered version of the sequence is used as a metric rather than the RDS of the sequence. The main source of baseline wander in many systems is AC coupling or other high pass filtering circuits. The amount of baseline wander caused by a code sequence can be estimated by passing the sequence through a model of the high pass filter 602 (which mimics AC-coupling), and subtracting the output of the filter from the input sequence, as shown in FIG. 6A. Equivalently, the amount of baseline wander caused by a code sequence can be estimated by passing the code sequence through a low pass filter 604 with a transfer function that complements the high pass filter, as shown in FIG. 6B. For example, if the high pass filter model has the transfer function H(z), then the low pass filter should have the transfer function F(z)=1−H(z).

Figure 7:
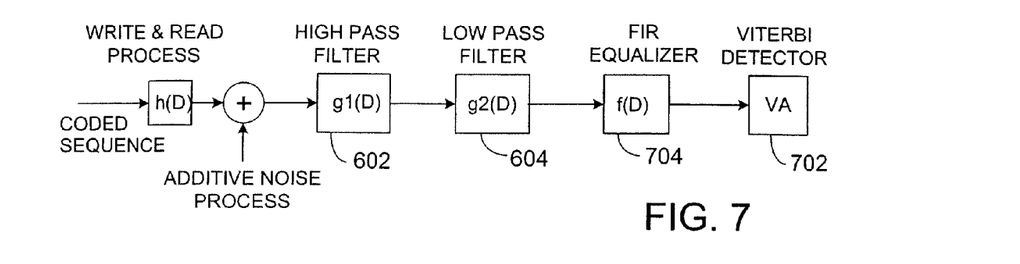
FIG. 7 is a block diagram of a discrete time model of a magnetic recording system.
Figure 8:
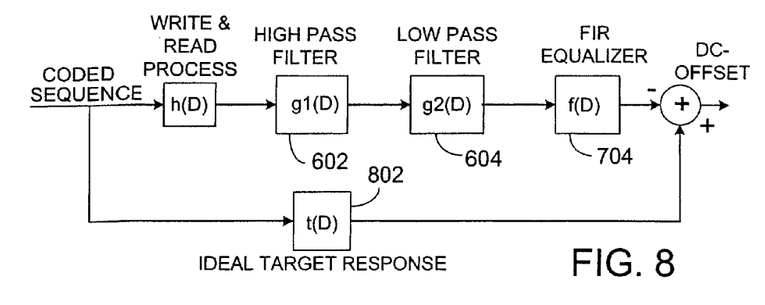
FIG. 8 is a block diagram of a discrete time model of DC-offset in a magnetic recording system.
Figure 9:
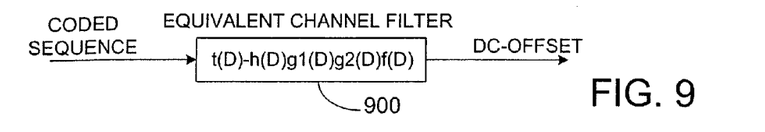
FIG. 9 is block diagram of a simplified model of DC-offset in a magnetic recording system.

Other, usually more complex, filters can be designed to mimic not only the impact of high pass filters, but also the impact of the write and read process and the signal shaping in the read channel. FIG. 7 shows a simple block diagram of a discrete time model of a magnetic recording channel. This model may be used as a basis for the DC-offset model shown in FIG. 8. Since the correct bit decisions are know, they may be used instead of a Viterbi detector 702. The DC-offset may be estimated by passing the encoded sequence through an ideal target response 802 and then subtracting the finite impulse response (FIR) equalizer output 704 from the target response output. This model can be simplified as shown in FIG. 9, where the filter 900 is given by H(D)=t(D)−h(D)g1(D)g2(D)f(D).

Although several examples have been given, any filter that generates an estimate of the DC-offset based on the encoded data sequence as input can be used for this purpose.

The following are exemplary parameters that may be used to determine if a sequence has a large DC-wander in systems using low pass filtered sequences as a metric:

If the largest DC-offset of the sequence is larger than a threshold;

If the largest DC-offsets of the sub-sequences are larger than a threshold;

If the DC-offset is larger than a threshold for more than another threshold number of bit-cycles;

If the DC-offset is larger than a threshold for more than another threshold number of times;

If the mean of the absolute value of the DC-offset is greater than a threshold.

Figure 10:
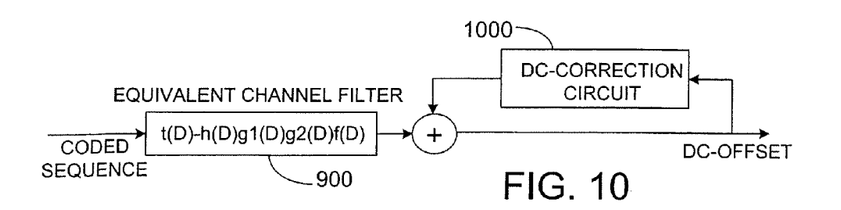
FIG. 10 is block diagram of a simplified model of DC-offset in a magnetic recording system using an adaptive DC-correction circuit.
Figure 11:
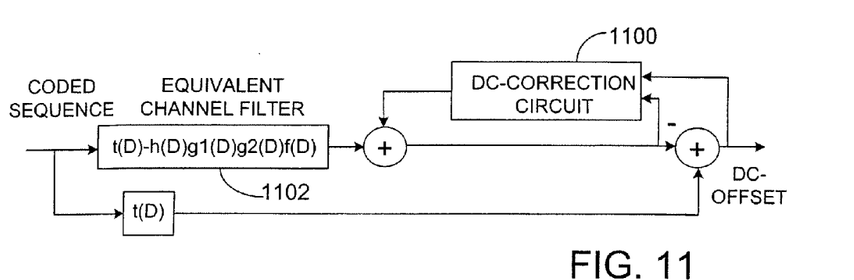
FIG. 11 is a block diagram of another simplified model of DC-offset in a magnetic recording system using an adaptive DC-correction circuit.

In another embodiment, a low pass filtered sequence with DC correction is used as a metric. Instead of just estimating the DC-offset based on filtering the encoded sequence, this method assumes that there is a DC-correction circuit built into the system. Different types of DC-correction circuits can be used. In FIG. 10, a block diagram of the filter is shown with an adaptive DC-correction circuit 1000. In most cases, the DC-correction circuit can be modeled as a low pass filter 900. Another block diagram of the DC-offset estimation filter with DC-correction circuit 1100 is shown in FIG. 11. Here, the DC-correction circuit uses the DC-corrected channel estimation filter output 1102 as its input.

In an alternative embodiment, several seeds may be used to scramble the encoded sequence in parallel. The scrambled sequences may then be encoded and evaluated in parallel. The seed that provides the best response may then be selected.

In other alternative embodiments, the first trial may not be scrambled. For example, block 302 and 402 in FIGS. 3 and 4, respectively, may be skipped when the sequence is first input to the write channel.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

What is claimed is:

1. A method comprising:
   writing data in a magnetic recording system using a write channel of the magnetic recording system;
   processing output data of the write channel in accordance with a read channel of the magnetic recording system to measure baseline wander; and
   triggering re-writing through the write channel using different data scramblings when the measured baseline wander fails to satisfy a criterion.

2. The method of claim 1, wherein the processing comprises modeling the read channel of the magnetic recording system.

3. The method of claim 2, comprising:
   determining which of the different data scramblings yielded a least baseline wander; and
   using the determined one of the different data scramblings when all the different data scramblings are exhausted.

4. The method of claim 2, wherein the modeling comprises using two or more metrics to measure baseline wander.

5. The method of claim 2, wherein the modeling comprises using a metric comprising a maximum absolute value of a running digital sum (RDS) over at least a portion of a sequence for the output data.

6. The method of claim 5, wherein using the metric comprises using the maximum absolute value of the RDS over an entirety of the sequence.

7. The method of claim 2, wherein the modeling comprises using a metric comprising a number of bit periods an absolute value of a running digital sum (RDS) is greater than a threshold.

8. The method of claim 2, wherein the modeling comprises using a metric comprising a mean value of an absolute value of a running digital sum (RDS).

9. The method of claim 2, wherein the modeling comprises using a metric comprising an absolute value of a low pass filtered signal generated from the output data.

10. The method of claim 9, comprising adding a DC-correction to the low pass filtered signal.

11. The method of claim 1, wherein the processing comprises modeling one or more high pass filtering circuits of the magnetic recording system.

12. The method of claim 11, wherein the one or more high pass filtering circuits comprise an AC coupling within the magnetic recording system.

13. The method of claim 12, wherein the AC coupling comprises an AC coupling to a preamplifier and the read channel of the magnetic recording system.

14. The method of claim 1, wherein the processing comprises using a discrete time model of DC offset in the magnetic recording system.

15. The method of claim 14, wherein using the discrete time model comprises using an equivalent channel filter.

16. The method of claim 15, wherein using the discrete time model comprises using an adaptive DC-correction circuit.

17. The method of claim 16, wherein using the discrete time model comprises using an ideal target response separate from the equivalent channel filter.

18. The method of claim 1, wherein the writing comprises encoding the data after scrambling of the data.

19. The method of claim 1, wherein the triggering comprises triggering re-writing through the write channel using different scrambling seeds when the measured baseline wander fails to exceed a threshold.

* * * * *